United States Patent
Rodniansky

(10) Patent No.: US 10,097,582 B2
(45) Date of Patent: *Oct. 9, 2018

(54) SECURE DATA REDACTION AND MASKING IN INTERCEPTED DATA INTERACTIONS

(71) Applicant: International Business Machines Corporation, Armonk, NY (US)

(72) Inventor: Leonid Rodniansky, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/553,235

(22) Filed: Nov. 25, 2014

(65) Prior Publication Data

US 2016/0149954 A1 May 26, 2016

(51) Int. Cl.
*H04L 29/08* (2006.01)
*H04L 29/06* (2006.01)

(52) U.S. Cl.
CPC .......... *H04L 63/166* (2013.01); *H04L 63/20* (2013.01); *H04L 63/0245* (2013.01); *H04L 67/322* (2013.01); *H04L 69/06* (2013.01)

(58) Field of Classification Search
CPC .............................. H04L 63/20; H04L 63/166
See application file for complete search history.

(56) References Cited

U.S. PATENT DOCUMENTS

| | | | |
|---|---|---|---|
| 2005/0114700 A1* | 5/2005 | Barrie | H04L 63/0236 726/4 |
| 2007/0180510 A1* | 8/2007 | Long | H04L 63/0236 726/10 |
| 2007/0300306 A1 | 12/2007 | Hussain | |
| 2008/0059474 A1* | 3/2008 | Lim | G06F 17/3089 |
| 2010/0131512 A1 | 5/2010 | Ben-Natan et al. | |
| 2010/0250497 A1 | 9/2010 | Redlich et al. | |

(Continued)

OTHER PUBLICATIONS

IBM, Setting up InfoSphere Guardium S-TAP to monitor Oracle database using ASO encryption on AIX, http://www-01.ibm.com/support/docview.wss?uid=swg21598026, Aug. 2, 2012.

(Continued)

*Primary Examiner* — Brandon S Hoffman
*Assistant Examiner* — Nega Woldemariam
(74) *Attorney, Agent, or Firm* — Garg Law Firm, PLLC; Rakesh Garg; David Woycechowsky

(57) ABSTRACT

A system, and computer program product for modifying intercepted data interactions are provided in the illustrative embodiments. At a security application executing in a security data processing system, an intercepted packet of data arranged according to a protocol is received from an intercepting agent executing in an intercepting data processing system. A security policy is applied to the intercepted packet. In an instruction according to a coding grammar, a modification of the intercepted packet is encoded. The instruction is suited for the encoding under a circumstance of the modifying. The instruction is sent to the intercepting agent. The intercepting agent at the intercepting data processing system performs the modification according to the security policy and independently of the protocol.

7 Claims, 12 Drawing Sheets

(56) References Cited

U.S. PATENT DOCUMENTS

2010/0287613 A1* 11/2010 Singh .................. H04L 63/0254
                                                          726/22
2011/0313981 A1    12/2011  Ben-Natan
2013/0212689 A1     4/2013  Ben-Natan et al.
2014/0095634 A1     4/2014  Govindaraman

OTHER PUBLICATIONS

IBM, InfoSphere Optim Data Masking Solution V2.2 documentation, http://pic.dhe.ibm.com/infocenter/igsec/v1/index.jsp.
Google, Encoding, https://developers.google.com/protocol-buffers/docs/encoding#varints, Sep. 3, 2014.

* cited by examiner (PRIOR - ART)

*FIG. 6*

```
00000000 : 5a 00 00 00 a0 26 38 00 2a 00 00 00 01 00 00 00  Z....&8.*.......
00000010 : 08 00 00 00 00 00 00 00 00 00 00 00 00 00 00 00  ................
00000020 : 01 00 00 00 36 00 00 00 07 5f 69 64 00 52 09 49  ....6...._id.R.I
00000030 : c7 71 67 0a 4c 3a 3c 27 b1 02 6e 61 6d 65 00 04  .qg.L:<'..name..
00000040 : 00 00 00 5a 6f 65 00 01 63 61 72 64 5f 6e 75 6d  ...Zoe..card_num
00000050 : 00 5e c6 e7 de c3 aa 20 43 00                    .^..... C.
```
602

```
{
  _id:ObjectId('520949C771670A4C3A3C27B1')
  ,name:'Zoe'
  ,card_num:2345678931223343
                  }
                 606
}
```
604

US 10,097,582 B2

SECURE DATA REDACTION AND MASKING IN INTERCEPTED DATA INTERACTIONS

TECHNICAL FIELD

The present invention relates generally to a system, and computer program product for ensuring security compliance of inter-system transactions. More particularly, the present invention relates to a system, and computer program product for secure data redaction and masking in intercepted data interactions.

BACKGROUND

A data processing system (system) interacts with another data processing system using a data network. Generally, during the interaction, one of the systems sends data, which the other system receives. The interacting systems exchange data in this manner any number of times, in any suitable form, and in any suitable sequence.

A request-response transaction is an example of data interactions between two or more systems. For example, one system (requesting system) can send data in the form of a request message. The other system (responding system) receives the data of the request message. The responding system sends data of the information requested in the request message. The requesting system receives the data of the requested information. Many request-response transactions can occur in this manner between the requesting system and the responding system. Generally, the requesting role and the responding role are specific to a transaction, and can reverse in another transaction.

One example of such data interaction is found in database transactions. A database client application executing on a client data processing system sends a query (request) to a database server application executing on a server data processing system. The database server responds to the database client with a result set (response).

Furthermore, one or both systems engaged in data interactions may exist in a cloud. Cloud computing is one of the emerging technologies that is enabling flexible and efficient computing. Cloud computing offers an on-demand model for computing that reduces, or in some cases, completely avoids the hardware and software maintenance costs for an end user of the computing services.

Cloud computing also generally has a lower total cost of ownership as compared to captive computing capabilities, such as dedicated/owned data processing systems. The flexibility of using selected computing resources when they are needed, as a service, is a key advantage of cloud computing that endear the cloud model to all types of users, including business enterprises, high power computing groups, and individual users.

SUMMARY

The illustrative embodiments provide a system, and computer program product for dynamic quality of service adjustment using device-side analytics. An embodiment receives, at a security application executing in a security data processing system from an intercepting agent executing in an intercepting data processing system, an intercepted packet of data arranged according to a protocol. The embodiment applies a security policy to the intercepted packet. The embodiment encodes, using a processor and a memory at the security data processing system, in an instruction according to a coding grammar, a modification of the intercepted packet, wherein the instruction is suited for the encoding under a circumstance of the modifying. The embodiment sends the instruction to the intercepting agent, wherein the intercepting agent at the intercepting data processing system performs the modification according to the security policy and independently of the protocol.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts an example protocol packet that can be modified in accordance with an illustrative embodiment;

DETAILED DESCRIPTION

Figure 1:
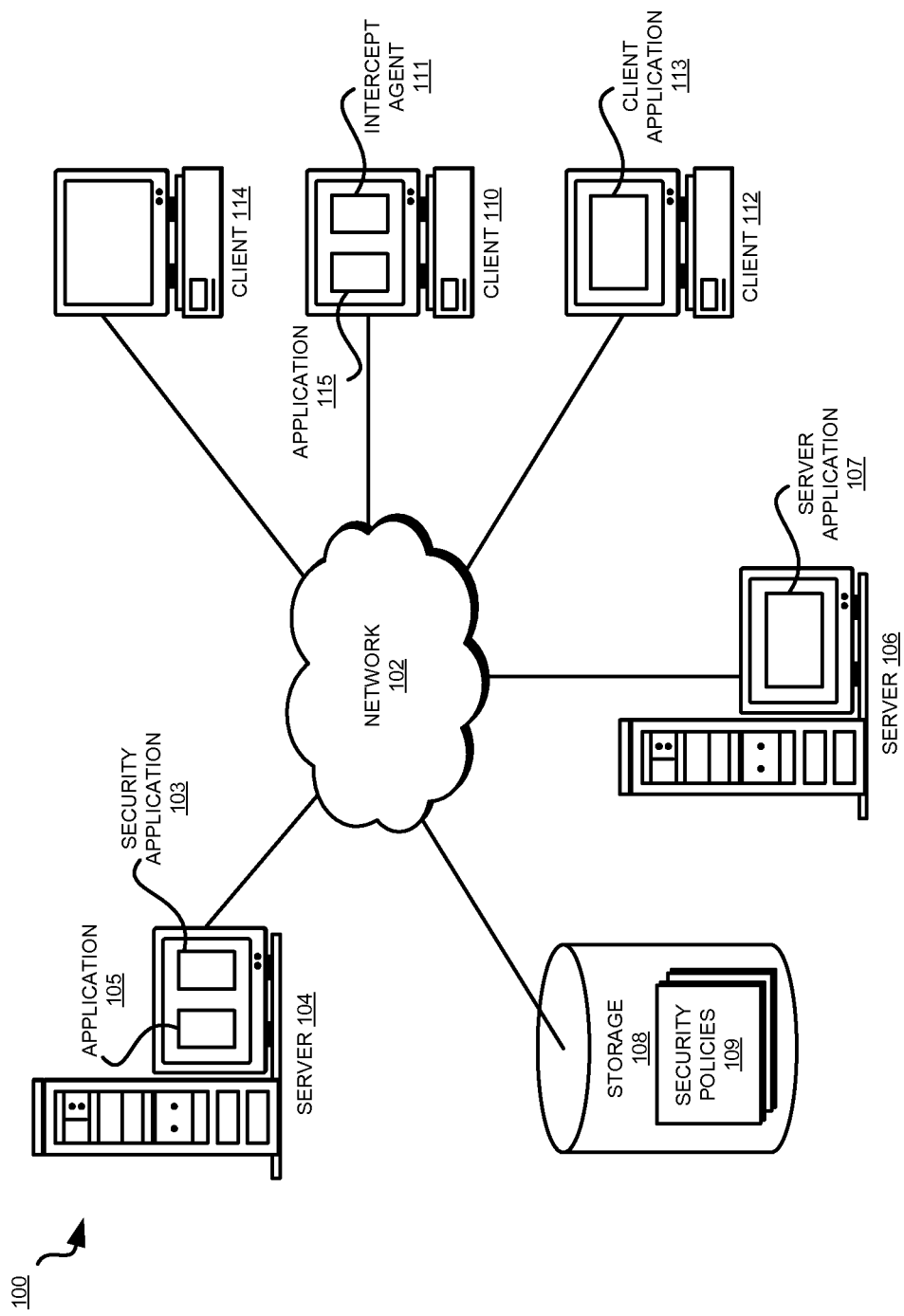
FIG. 1 depicts a block diagram of a network of data processing systems in which illustrative embodiments may be implemented.

A protocol packet (packet) contains data that is arranged according to a protocol specification and is transmitted from one system and received by another system during a data interaction. A database packet is a non-limiting example of a protocol packet that is structured according to a database protocol, such as SAP HANA DB wire protocol, MongoDB wire protocol, or MS SQL TDS, and is exchanged between a database client and a database server during a database transaction according to the database protocol between the two systems. A cloud application protocol packet is another non-limiting example of a protocol packet that is structured according to a protocol, such as HADOOP RPC, THRIFT, or Google Protocol Buffers, and is exchanged between a cloud client and a cloud server during a data interaction according to the cloud application protocol between the participating systems. A data packet is another non-limiting example of a protocol packet that is structured according to Transmission Control Protocol/Internet Protocol (TCP/IP) and is exchanged during TCP/IP communication between a pair of participating systems. Any trademarks in the protocol names belong to their respective owners.

Generally, within the scope of the illustrative embodiments, data content (data, content, or data content) in a protocol packet can be organized, structured, or arranged according to any suitable protocol. Furthermore, any type or size of data can be included in the protocol packet without limitation. Additionally, within the scope of the illustrative embodiments, the protocol packets can be transmitted using any protocol, or can participate in any protocol without limitation.

The illustrative embodiments recognize that a protocol packet can include data that can be sensitive, protected, or otherwise subject to restricted access. Such data is collectively referred to as restricted data. Therefore, data interactions are often governed by one or more security policies to ensure that those interactions are in compliance with the rules, restrictions, limitations, or conditions of one or more security policies governing the restricted data.

Accordingly, determining whether the protocol packets, which are being exchanged between systems, comply with one or more security policies is important. An intercept agent is an application or a component configured to intercept, receive, or otherwise gain access to the protocol packets being transmitted during data interactions.

The intercept agent sends the protocol packets that are intercepted to a security application. The security application has access to one or more security policies governing the restricted data. The security application examines each protocol packet received from the intercept agent for compliance with one or more security policies.

Presently, if the intercepted protocol packet does not contain any restricted data, the security application directs the intercept agent, via a release directive, to release the intercepted protocol packet. The intercepted protocol packet proceeds to the intended destination.

If the intercepted protocol packet includes restricted data, the security application modifies the restricted data found in an intercepted protocol packet. For example, if credit card numbers were categorized as restricted data, and an intercepted protocol packet included a credit card number, the security application masks the credit card number in the protocol packet.

Redaction is the process of removing, reducing, qualifying, or otherwise conditioning the original data such that redacted data appears or operates differently from the original data. Consider an example database protocol packet including an SQL statement. Suppose the original SQL statement is, "SELECT SALARY FROM EMPLOYEES". An example packet redaction is, "SELECT SALARY FROM EMPLOYEES WHERE USER_ROLE='DBA'". Where the original query requested records of all employees, the redacted query now selects records of only those employees who are database administrators. Thus, the redaction has qualified the original query, or reduced the records searched or returned, or removed some employee records from the result set or search, or otherwise conditioned the query to perform a search conditioned upon a role.

Additionally, after such redaction database protocol may have to be reconstructed or checked for compliance according to the database protocol used for the packet. Instructions for such reconstruction or checking are contemplated within the scope of the instructions described herein.

Masking is a form of redaction. Masking changes the original data so that the masked data appears different from the original data. For example, in one example form of masking, the original data is replaced with blanks, zeros, null-value, or some other pattern. Generally, within the scope of the illustrative embodiments, an embodiment described using masking is similarly applicable using redacting or other modifications.

The redaction and/or masking results in a modified protocol packet. The security application sends the modified protocol packet back to the intercept agent. The intercept agent transmits the modified protocol packet instead of the intercepted protocol packet to the intended recipient of the intercepted protocol packet.

The intercepted protocol packet is held, or not allowed to proceed to the destination until either the security application directs the intercept agent via a release directive to release, or the security application sends a modified protocol packet to the intercept agent. The illustrative embodiments recognize that operating in the presently available method, the intercept agent and the security application cause significant delays in the data interactions due to such hold times.

The illustrative embodiments further recognize that operating in the presently available method, the intercept agent and the security application cause significant increase in the network traffic. The illustrative embodiments recognize that the protocol packets can be significant in size, for example, a protocol packet containing a Mongo DB database result set presently can be as much as sixteen megabytes in size. A modified protocol packet resulting from such sizeable protocol packets are comparable in size.

Furthermore, the security application and the intercept agent have to be executed on separate data processing systems for a variety of reasons. For example, the intercept agent is often under the control of a different group of people than the people who administrate the security systems, and the security systems cannot be exposed to outside control as a matter of security policy in many organizations. As another example, the intercept agent can be executed on a system that provides other services, e.g., a database service. Executing the security application on such a system increases the workload on such systems and can lead to degraded performance of other services executing thereon.

Thus, the illustrative embodiments recognize that sending the modified protocol packet back from the system where the security application executes to the system where the intercept agent executes causes substantial amounts of data to be placed on the network used for data communications between the two systems. Such network may pass through or utilize networking components such as routers and switches that manage other network traffic between other systems and applications as well. The increased data traffic from the security operations can therefore also deteriorate network service to other systems and applications.

The illustrative embodiments used to describe the invention generally address and solve the above-described problems and other problems related to securing data interactions. The illustrative embodiments provide a system, and computer program product for secure data redaction and masking in intercepted data interactions.

Certain embodiments are implemented as an application operating within, as a part of, in conjunction with, or in communication with a security application. Employing an embodiment in this manner results in a modified security application. Certain embodiments are implemented as an application operating within, as a part of, in conjunction with, or in communication with an intercept agent. Employing an embodiment in this manner results in a modified intercept agent.

The case where an intercepted protocol packet does not include restricted data, the modified security application continues to direct the intercept agent via a release directive to release the intercepted protocol packet as in the prior-art. This case will not be described further in this disclosure. The remainder of the disclosure includes descriptions of the operations of the various embodiments employed within a modified security application when the intercepted protocol packet includes restricted data.

When the modified security application receives an intercepted protocol packet that includes restricted data, an embodiment makes a determination whether to create the modified protocol packet at the system where the modified security application is executing (security system) or enable the creation of the modified protocol packet at the system where the intercept agent is executing (intercept system). If the embodiment determines that the modified protocol packet should be created at the intercept system, the embodiment sends instructions that are usable by a modified intercept agent to modify the intercepted protocol packet and produce the modified protocol packet at the intercept system. If the embodiment determines that the modified protocol packet should be created at the security system, the embodiment modifies the intercepted protocol packet and produce the modified protocol packet at the security system and sends to the intercept system.

The instructions that are usable by a modified intercept agent to modify the intercepted protocol packet and produce the modified protocol packet at the intercept system are significantly smaller than the resulting modified protocol packet. As an example described later in this disclosure, an example intercepted protocol packet is approximately ninety bytes in size, whereas an instruction sent from the security system to the intercept system and sufficient to create the modified protocol packet of approximately the same size at the intercept system is only four bytes long. Thus, sending the instruction to modify instead of the modified protocol packet saves significant amount of network traffic, when tens of thousands or millions of protocol packets of significantly larger sizes are processed using the illustrative embodiments over a period.

In order to make the determination whether to create the modified protocol packet at the security system or the intercept system, the embodiment considers a variety of factors that affect the determination.

For example, one embodiment determines whether the network traffic at the time the intercepted protocol packet is to be processed exceeds a threshold. If the threshold is not exceeded, i.e., the network is not congested or the traffic imposed by transmitting the modified protocol packet from the security system to the intercept system will not degrade the network's performance below a limit, then the embodiment allows the modified security application to create and transmit the modified protocol packet. If the threshold is exceeded, i.e., the network is congested or the traffic imposed by transmitting the modified protocol packet from the security system to the intercept system will degrade the network's performance below a limit, then the embodiment sends the instruction usable for creating the modified protocol packet at the intercept system, and avoids transmitting the modified protocol packet from the security system.

As another example, one embodiment determines whether the workload or utilization of the intercept system at the time the intercepted protocol packet is to be processed exceeds a threshold. If the threshold is not exceeded, i.e., the intercept system is not busy or the workload imposed by creating the modified protocol packet at the intercept system will not degrade the intercept system's performance below a limit, then the embodiment sends the instruction usable for creating the modified protocol packet at the intercept system, and avoids transmitting the modified protocol packet from the security system. If the threshold is exceeded, i.e., the intercept system is busy or the workload imposed by creating the modified protocol packet at the intercept system will degrade the intercept system's performance below a limit, then the embodiment allows the modified security application to create and transmit the modified protocol packet.

As another example, one embodiment determines whether the workload or utilization of the security system at the time the intercepted protocol packet is to be processed exceeds a threshold. If the threshold is not exceeded, i.e., the security system is not busy or the workload imposed by creating the modified protocol packet at the security system will not degrade the security system's performance below a limit, then the embodiment allows the modified security application to create and transmit the modified protocol packet. If the threshold is exceeded, i.e., the security system is busy or the workload imposed by creating the modified protocol packet at the security system will degrade the security system's performance below a limit, then the embodiment sends the instruction usable for creating the modified protocol packet at the intercept system, and avoids transmitting the modified protocol packet from the security system.

As another example, one embodiment determines whether the number of modification needed in the intercepted protocol packet, or a type of modification needed in the intercepted protocol packet, or some combination thereof warrant creating the modified protocol packet at the security system. For example, if the number of modifications exceeds a threshold, then under certain circumstances the size of the instruction may be comparable to the size of the modified protocol packet, making the transfer of the modification responsibilities from the security system to the intercept system counter-productive. As another example, if the type of modification requires disclosing a security policy, other security information, or other guarded facts or data, to the intercept system, then transferring the modification responsibilities from the security system to the intercept system may not be desirable.

An embodiment in a modified security application creates the instruction according to a coding grammar. A coding grammar (grammar) is a manner of representing combinations of one or more operations or operation codes, fragments of data, positions in the instruction or intercepted data, flags, indicators, selectors, and other parameters. Different coding grammars may have different strengths. For example, one grammar may be particularly suited for performing a data modification in a particular manner, whereas another grammar may be particularly suited for performing a data modification in a different manner.

Different coding grammars can also produce different instructions for the same purpose or result. Instructions produced using one grammar may be more compact than a comparable instruction produced using a different grammar.

When an embodiment determines that an instruction should be sent from the security system instead of the modified protocol packet, the embodiment further determines a comparative advantage of sending an instruction according to one grammar over another instruction according to another grammar. In other words, the embodiment optimizes the instruction, or selects the optimum instruction according to one or more determinations and considerations described herein. For example, when the network usage is within a tolerance limit of a threshold and the intercept system has significant excess capacity, the embodiment selects the grammar that will produce the most compact instruction. It may be that the compact instruction requires more computations or processing at the intercept system, but the conditions in the network and the intercept system justify selecting such grammar.

As another example, when the network usage is significantly below a threshold, then regardless of the available capacity at the intercept system, the embodiment selects the grammar that will produce a comparatively detailed instruction than the most compact instruction. It may be that the more detailed the instruction, the less computations or processing the instruction requires at the intercept system, but the conditions in the network justify selecting such grammar.

When an embodiment selects a grammar, and codes the instruction according to the selected grammar, the embodiment also informs the modified intercept agent about the selected grammar. This information is helpful for an embodiment executing at the modified intercept agent in decoding the instruction correctly and applying the masking or modification operations encoded therein.

As an example, one embodiment informs the modified intercept agent about the selected grammar by setting a code in a location in the instruction that is pre-agreed by the modified intercept agent and the modified security application for identifying the selected grammar. As another example, another embodiment informs the modified intercept agent about the selected grammar by using grammar-specific codes in the instruction. For example, each grammar may have a set of operation codes that is unique to the grammar. By identifying the set to which a code belongs, the modified intercept agent can identify the grammar used in the instruction. From this disclosure, many other ways for communicating the grammar selection will be apparent to those of ordinary skill in the art and the same are contemplated within the scope of the illustrative embodiments.

In response to sending an intercepted protocol packet to the modified security application, an embodiment employed in the modified intercept agent receives an instruction from the modified security application. The embodiment decodes the instruction using the correct grammar. The embodiment modifies the intercepted protocol packet at the intercept system by applying the modification operations specified in the instruction without needing or using the knowledge of the protocol. The modified intercept agent then sends the modified protocol packet to the intended destination of the intercepted protocol packet.

A method of an embodiment described herein, when implemented to execute on a data processing system, comprises substantial advancement of the functionality of that data processing system in securing data interactions. For example, an embodiment enables selective offloading data masking or modification operations from the system where the security application executes to the system where the intercept occurs. The offloading is sensitive to a variety of conditions existing in the data network, the security system, the intercept system, or a combination thereof. The offloading is accomplished by sending optimized instructions for modifying the intercepted data such that the instructions are much smaller than the resulting modified data. Such selective offloading using optimized instructions, and the resulting improvement in the security system's performance, is unavailable in presently operating security systems. Thus, a substantial advancement of such security systems by executing a method of an embodiment comprises the prevention or mitigation of at least the costs and delays in security auditing of data interactions.

The illustrative embodiments are described with respect to certain protocol packets, protocols, standards, networks, services, applications, usages, modifications, encoding, grammars, positions, locations, selections, sizes, conditions, considerations, values, policies, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
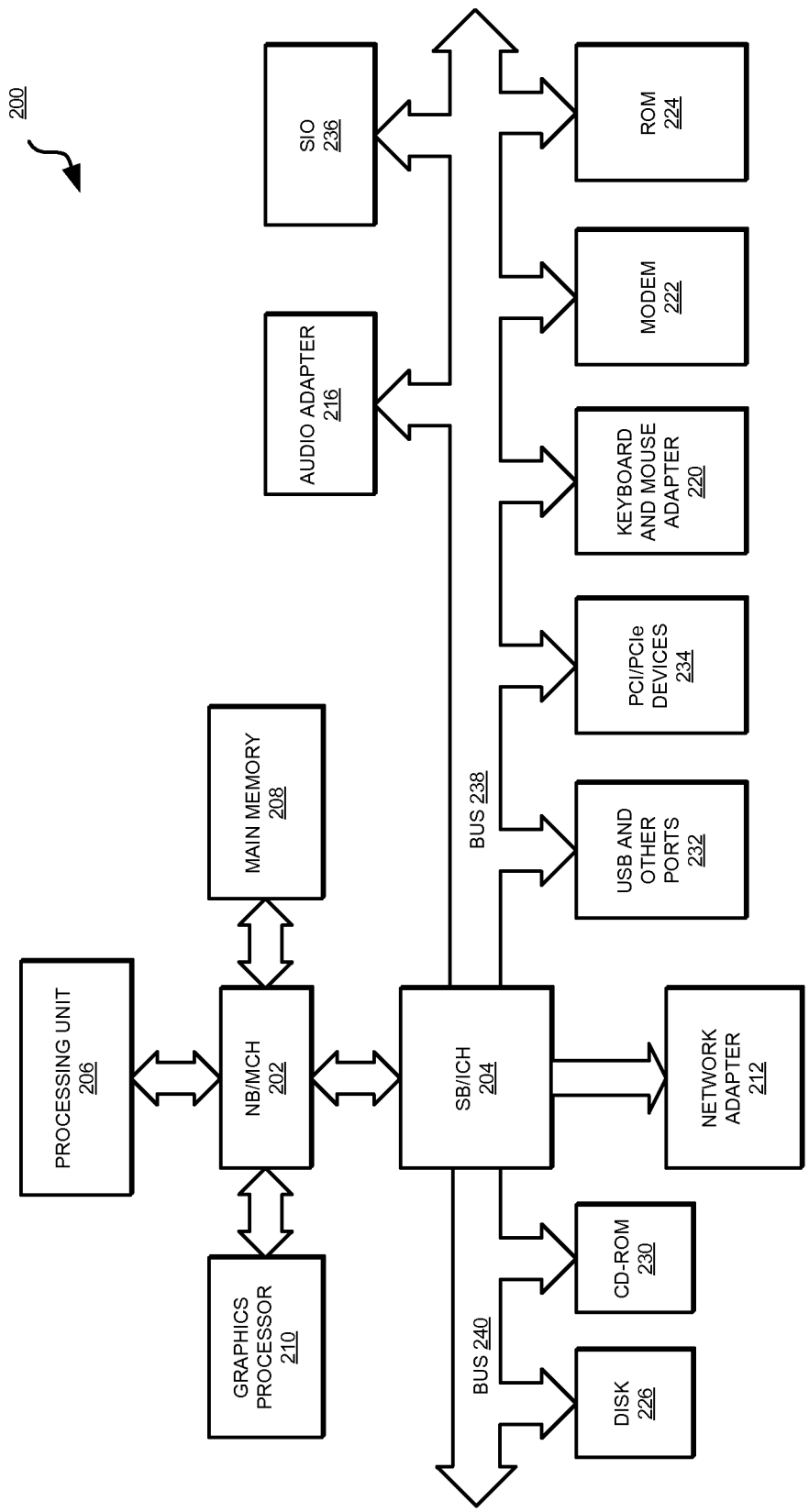
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Security application 103 is an existing security application for modifying intercepted protocol packets. Application 105 implements one or more embodiments described herein. Application 105 and security application 103 together form a modified security application as described herein. The modified security application uses one or more security policies 109 for determining a suitable masking or modification of any restricted data in an intercepted protocol packet. Intercept agent 111 is an existing intercept agent for intercepting protocol packets. Application 115 implements one or more embodiments described herein. Application 115 and intercept agent 111 together form a modified intercept agent as described herein. Client application 113 and sever application 107 are example applications engaged in an example data interaction whose protocol packets are intercepted and masked by a combination of the modified security application and the modified intercept agent as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of other devices in which computer usable program code or instructions implementing the processes of the illustrative embodiments may be located. Data processing system 200 is described as a computer only as an example, without being limited thereto. Implementations in the form of other devices may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as security application 103, application 105, server application 107, client application 113, intercept agent 111, and application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile device.

Figure 3:
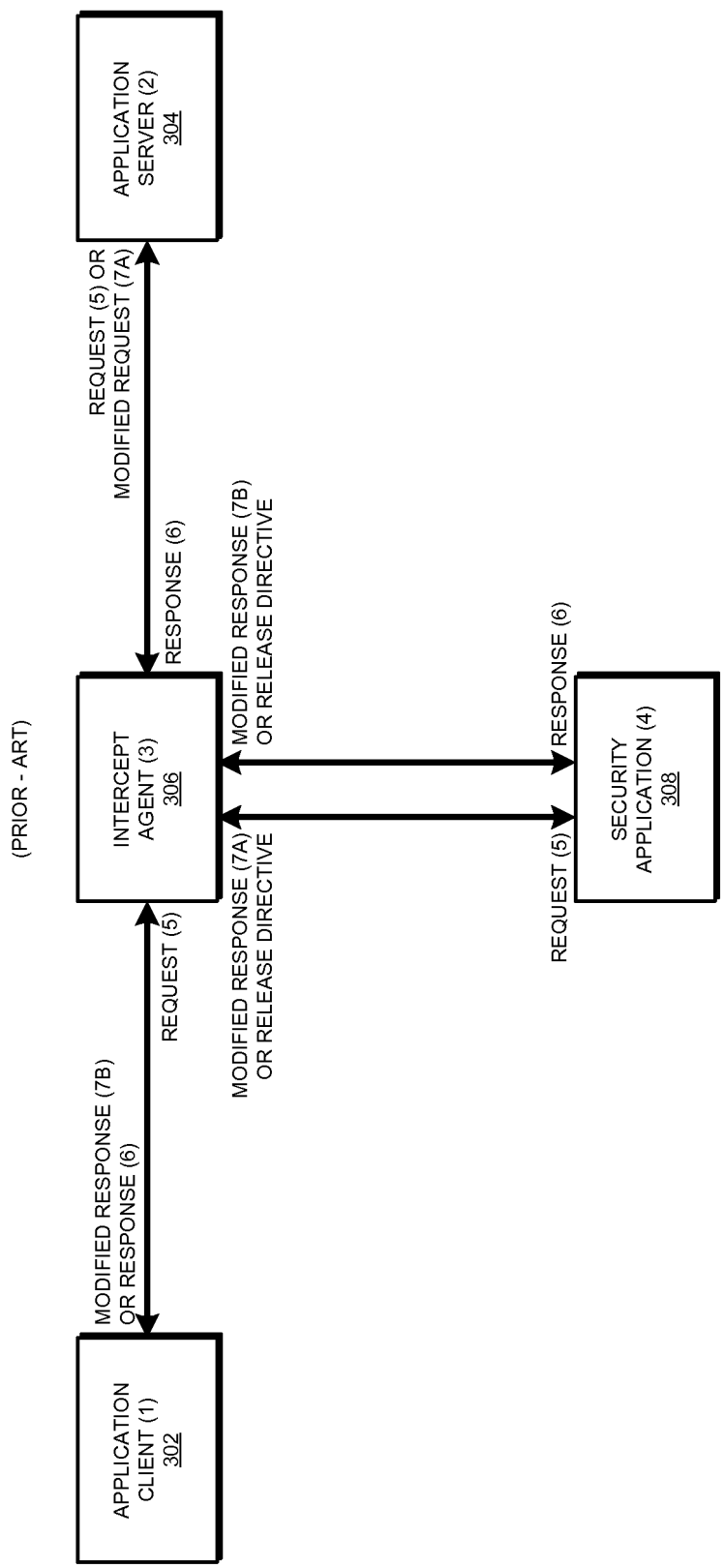
FIG. 3 depicts an example prior-art configuration for security audit of data interactions that can be improved by using an illustrative embodiment.

With reference to FIG. 3, this figure depicts an example prior-art configuration for security audit of data interactions that can be improved by using an illustrative embodiment. Client application 302, labeled (1), is an example of client application 113 in FIG. 1. Server application 304, labeled (2), is an example of server application 107 in FIG. 1. Intercept agent 306, labeled (3) is an example of intercept agent 111 in FIG. 1. Security application 308, labeled (4), is an example of security application 103 in FIG. 1.

Client application 302 sends request (5) to server application 304. Intercept agent 306 intercepts request (5) and sends to security application 308. Security application 308 sends either a release directive or modified request (7A) to intercept agent 306. Accordingly, intercept agent 306 sends request (5) or modified request (7A) to server application 304.

Server application 304 sends response (6) to client application 302 in response to request (5) or modified request (7A). Intercept agent 306 intercepts response (6) and sends to security application 308. Security application 308 sends either a release directive or modified response (7B) to intercept agent 306. Accordingly, intercept agent 306 sends response (6) or modified response (7B) to client application 302.

Figure 4:
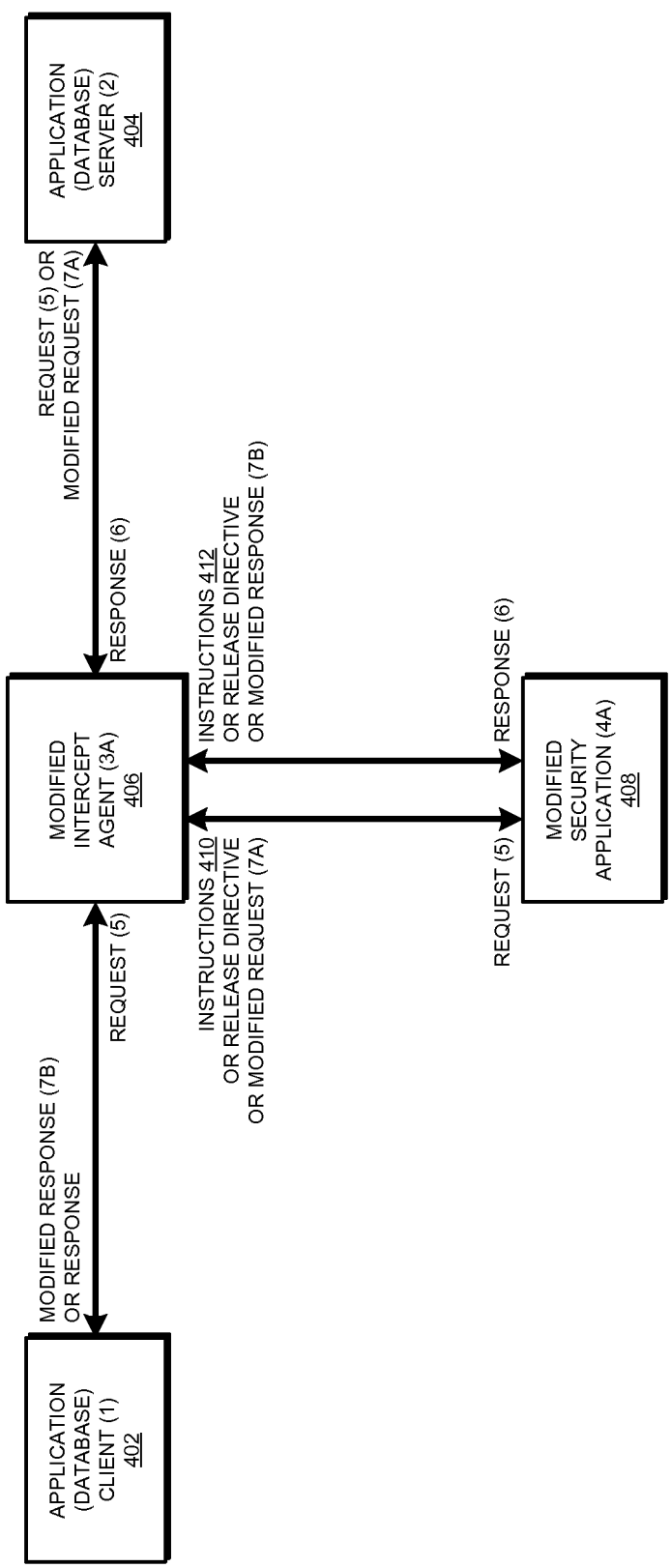
FIG. 4 depicts an example configuration for secure data redaction and masking in intercepted data interactions in an illustrative embodiment.

With reference to FIG. 4, this figure depicts an example configuration for secure data redaction and masking in intercepted data interactions in an illustrative embodiment. Client application 402, labeled (1), is an example of client application 302 in FIG. 3. Server application 404, labeled (2), is an example of server application 304 in FIG. 3. Modified intercept agent 406, labeled (3A) is an example of intercept agent 306 in FIG. 3 modified using application 115 in FIG. 1. Modified security application 408, labeled (4A), is an example of security application 308 in FIG. 3 modified using application 105 in FIG. 1.

Client application 402 sends request (5) to server application 404. Modified intercept agent 406 intercepts request (5) and sends to modified security application 408.

Modified security application 408 sends either a release directive to release request (5) to server application 404, or instructions 410 for modifying the intercepted request (5), at the system where modified intercept agent 406 is executing, or modified request (7A). If modified intercept agent 406 receives a release directive, modified intercept agent 406 releases request (5) to server application 404. If modified intercept agent 406 receives one or more instructions 410, modified intercept agent 406 uses the one or more instructions 410 to construct modified request (7A) and send the constructed modified request (7A) to server application 404. If modified intercept agent 406 receives modified request (7A), modified intercept agent 406 sends the received modified request (7A) to server application 404.

Server application 404 sends response (6) to client application 402. Modified intercept agent 406 intercepts response (6) and sends to modified security application 408.

Modified security application 408 sends either a release directive to release response (6) to client application 404, or instructions 412 for modifying the intercepted response (6), at the system where modified intercept agent 406 is executing, or modified response (7B). If modified intercept agent 406 receives a release directive, modified intercept agent 406 releases response (6) to client application 404. If modified intercept agent 406 receives one or more instructions 412, modified intercept agent 406 uses the one or more instructions 412 to construct modified response (7B) and send the constructed modified response (7B) to client application 404. If modified intercept agent 406 receives modified response (7B), modified intercept agent 406 sends the received modified response (7B) to client application 404.

In one embodiment, instructions 410 comprise a single instruction, where the single instruction 410 is used for constructing modified request (7A) at the intercept system.

In another embodiment, instructions 410 comprise a set of more than one instructions, where the whole set of instructions 410 is used for constructing modified request (7A) at the intercept system.

In one embodiment, instructions 412 comprise a single instruction, where the single instruction 412 is used for constructing modified response (7B) at the intercept system. In another embodiment, instructions 412 comprise a set of more than one instructions, where the whole set of instructions 412 is used for constructing modified response (7B) at the intercept system.

Intercepting request (5) comprises intercepting a protocol packet, where the protocol packet contains all or part of the data of request (5). Sending modified request (7A) comprises sending a modified protocol packet, where the modified protocol packet contains all or part of the data of modified request (7A) resulting from the modified protocol packet. Intercepting response (6) comprises intercepting a protocol packet, where the protocol packet contains all or part of the data of response (6). Sending modified response (7B) comprises sending a modified protocol packet, where the modified protocol packet contains all or part of the data of modified response (7B) resulting from the modified protocol packet. More than one protocol packets of request (5), modified request (7A), response (6), or modified response (7B) can be processed in a similar manner.

Figure 5A:
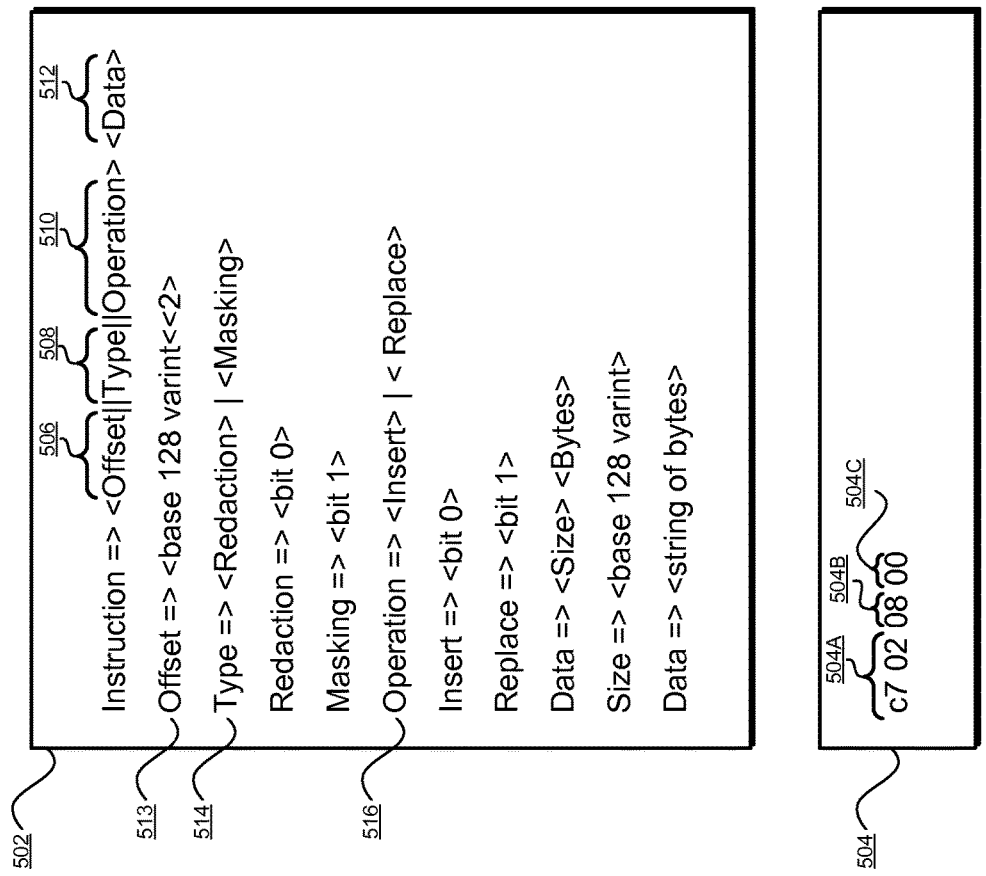
FIG. 5A depicts an example grammar and an example instruction in accordance with an illustrative embodiment.

With reference to FIG. 5A, this figure depicts an example grammar and an example instruction in accordance with an illustrative embodiment. Grammar 502 is usable at modified security application 408 in FIG. 4 to produce instruction 504. Instruction 504 is an example of instructions 410 or 412 in FIG. 4.

The parameters depicted and described in grammar 502 and resulting example instruction 504 are not intended to be limiting on the illustrative embodiments. These examples are described here only to clarify the operation of an embodiment. From this disclosure, those of ordinary skill in the art will be able to conceive many other different or additional grammars, parameters, and instructions, and the same are contemplated within the scope of the illustrative embodiments.

Instruction 504 comprises four bytes of information, "c7 02 08 00".

Only as an example and without implying any limitation thereto, instruction 504 is constructed using Google™ compact scheme of representation integer values (varint). How this scheme performs integer encoding in Base 128 is known to those of ordinary skill in the art.

Only as an example, and without implying any limitation thereto, grammar 502 employs this example varint representation. Accordingly, instruction 504 "c7 02 08 00" reads as follows—

According to "offset" parameter 513 in grammar 502, grammar 502 instructs to employ base varint 128, and consider the first "2" (2) bytes of instruction 504 as offset. So, read the first base 128 varint to get part 504A of instruction 504, to wit, "c7 02"— c7 02=1100 0111 0000 0010

Drop the most significant bit (msb) from each byte to get—

100 0111 000 0010

Reverse two groups of 7 bits to get—

000 0010 100 0111

Which gives the value 101000111

The first 7 bits represent offset 506 in instruction 504: 1010001=64+16+1=81

So offset 506 in instruction 504 is 81.

The two last bits are "11". These are Type parameter 508 and Operation parameter 510. Type 508 is "masking" according to parameter 514 because of value "1" in the first of the last two bits. Operation 510 is "replace" according to parameter 516 because of value "1" in the second of the last two bits.

The next 128 varint in command 504 is part 504B, to wit, "08"

08=8. This means replace 8 bytes in the protocol packet. Because the Type is "masking", the following part 504C of instruction 504 is string "00" and includes only one byte 00.

Thus, when modified intercept agent 406 in FIG. 4 receives instruction 504, modified intercept agent 406 received the instruction "Mask protocol packet data from byte 81 by replacing 8 bytes with 00 each".

Figure 5B:
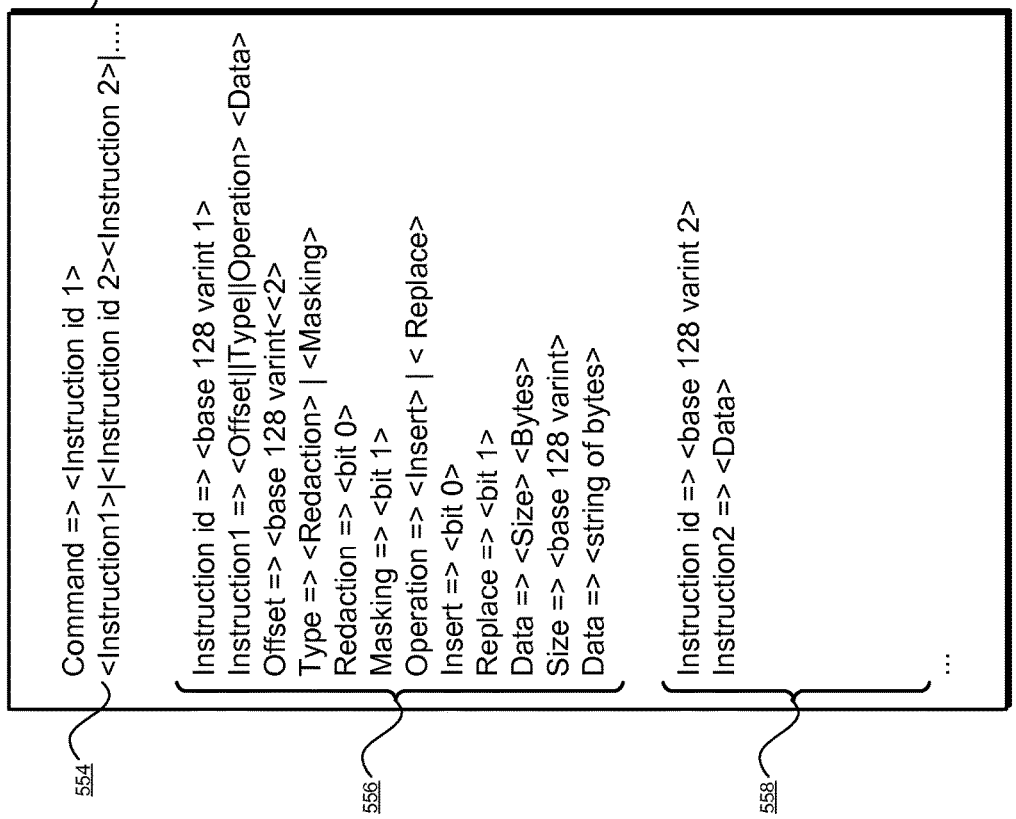
FIG. 5B depicts an example grammar for sending a set of multiple instructions in accordance with an illustrative embodiment.

With reference to FIG. 5B, this figure depicts an example grammar for sending a set of multiple instructions in accordance with an illustrative embodiment. Grammar 552 is a modified form of grammar 502 in FIG. 5A.

When a set of instructions includes a plurality of instructions, the several instructions can be provided according to example grammar 502 as follows using example "Command" parameter 554.

Parameters 556 describe how instruction 1 having instruction ID "instruction1" is to be decoded in the manner described above. Parameters 558 describe how instruction 2 having instruction ID "instruction2" is to be decoded in the manner described above. Any number of instructions can be included in command 554 and corresponding parameters can be included in grammar 552 to enable the decoding and application of the instructions.

The structure of grammar 502 and 552 are available, amongst many other grammars, to modified intercept agent 406 in FIG. 4. In one embodiment, modified intercept agent 406 reads the first base 128 int value and becomes aware that grammar 502 is to be used to decode instruction 504, and grammar 552 is to be used to decode the set of instructions in command 554. Many other ways of communicating information are available and can be used to communicate which grammar to select for decoding a particular instruction without departing the scope of the illustrative embodiments. A bit-flag, a byte value or value-range, a specific code in a parameter, or a membership of a code in a pre-defined set are some non-exhaustive example ways of communicating the grammar selection information.

With reference to FIG. 6, this figure depicts an example protocol packet that can be modified in accordance with an illustrative embodiment. Protocol packet 602 is an example protocol packet containing response (6) in FIG. 4.

Protocol packet 602 contains hexadecimal data as an example. Protocol packet 602 is 90 bytes in size.

Protocol packet 604 depicts a human-readable form of the data in protocol packet 602. Part 606 of human-readable form 604 is an example credit card number.

Modified intercept agent 406 in FIG. 4 intercepts protocol packet 602 and sends to modified security application 408 in FIG. 4. Assume that a security policy in security policies 109 in FIG. 1 prohibits transmitting credit card numbers in data interactions. Accordingly, modified security application 408 constructs instruction 504 in FIG. 5A and sends to modified intercept agent 406 in FIG. 4.

Figure 7:
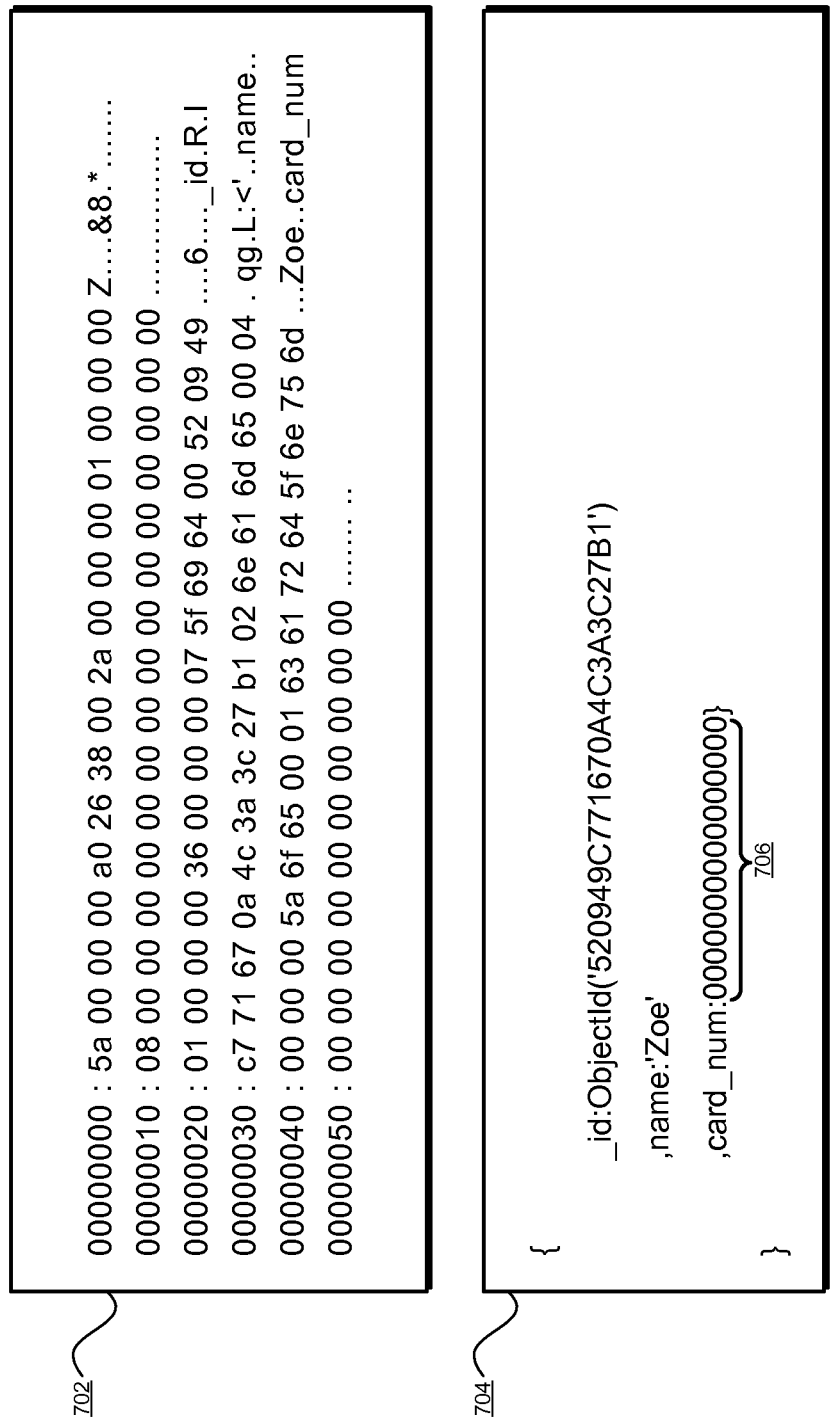
FIG. 7 depicts an example result of modifying a protocol packet for secure data redaction and masking in intercepted data interactions in accordance with an illustrative embodiment.

Modified intercept engine 406 decodes instruction 504 according to grammar 502 and applies the modifications instructed in instruction 504 to protocol packet 602. FIG. 7 shows the result of performing the modification of protocol packet 602 at the intercept system in this manner.

With reference to FIG. 7, this figure depicts an example result of modifying a protocol packet for secure data redaction and masking in intercepted data interactions in accordance with an illustrative embodiment. Protocol packet 702 is a modified form of protocol packet 602 in FIG. 6.

Recall that instruction 504 instructed modified intercept agent to "Mask protocol packet data from byte 81 by replacing 8 bytes with 00 each." The eight bytes from offset 81 in protocol packet 602 contain the credit card number, which has to be masked with "00". When modified intercept agent 406 performs this masking operation on protocol packet 602, modified protocol packet 702 results.

Protocol packet 704 depicts a human-readable form of the data in protocol packet 702. Part 706 of human-readable form 704 corresponds to part 606 in human-readable form 604 in FIG. 6. Upon executing the operations of instruction 504 at the intercept system, the example credit card number in part 706 is masked with a string of zeros as shown.

Figure 8:
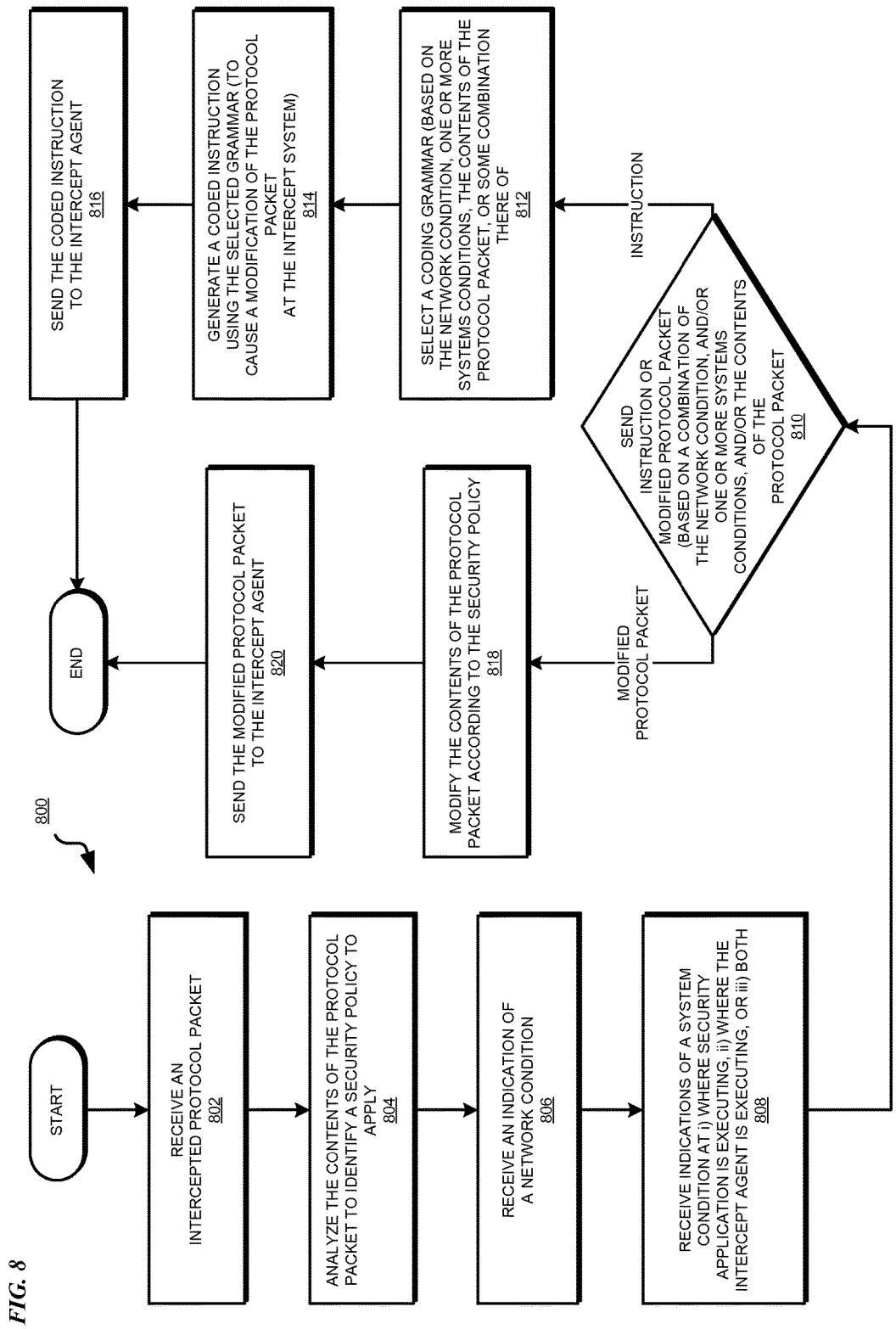
FIG. 8 depicts a flowchart of an example process for secure data redaction and masking in intercepted data interactions in accordance with an illustrative embodiment.

With reference to FIG. 8, this figure depicts a flowchart of an example process for secure data redaction and masking in intercepted data interactions in accordance with an illustrative embodiment. Process 800 can be implemented in modified security application 408 in FIG. 4.

The modified security application receives an intercepted protocol packet of data (block 802). The modified security application analyzes the data contents of the protocol packet to identify a security policy to apply to the protocol packet (block 804).

The modified security application may further receive one or more indicators of the circumstances in which the data contents of the protocol packet have to be masked or modified. The indicators of blocks 806 and 808 may be received in any combination and form, including omitting one or more of the indicators described therein.

As an example, the modified security application receives an indication of a network condition (block 806). Some examples of the indication of a network condition include but are not limited to a network performance metric, a network congestion metric, a network throughput metric, and the like, at a particular networking device or across the network generally.

As another example, the modified security application receives one or more indications of a condition at the intercept system, a condition at the security system, or both (block 808). Some examples of the indication of a system condition include but are not limited to a system performance metric, a system or CPU utilization metric, a scheduler queue size, and the like.

Based on the combination of the condition indicators received in block 806, block 808, or both, as the case may be, the modified security application determines whether to modify the protocol packet at the security system or to send an instruction, coded according to a grammar, to perform the modification at the intercept system (block 810).

If modified security application determines that an instruction should be sent ("Instruction" path of block 810), the modified security application selects a coding grammar (block 812). The selection in block 812 can depend on a variety of factors including but not limited to the network conditions, the conditions at one or more data processing system, the contents of the protocol packet, or some combination thereof.

The modified security application generates a coded instruction using the selected grammar to cause the modification of the protocol packet at the intercept system (block 814). The modified security application sends the coded instruction to the modified intercept agent (block 816). The modified security application ends process 800 thereafter.

If modified security application determines that the protocol packet should be modified at the security system ("Modified protocol packet" path of block 810), the modified security application modifies the contents of the protocol packet according to the security policy (block 818). The modified security application sends the modified protocol packet to the modified intercept agent (block 820). The modified security application ends process 800 thereafter.

Figure 9:
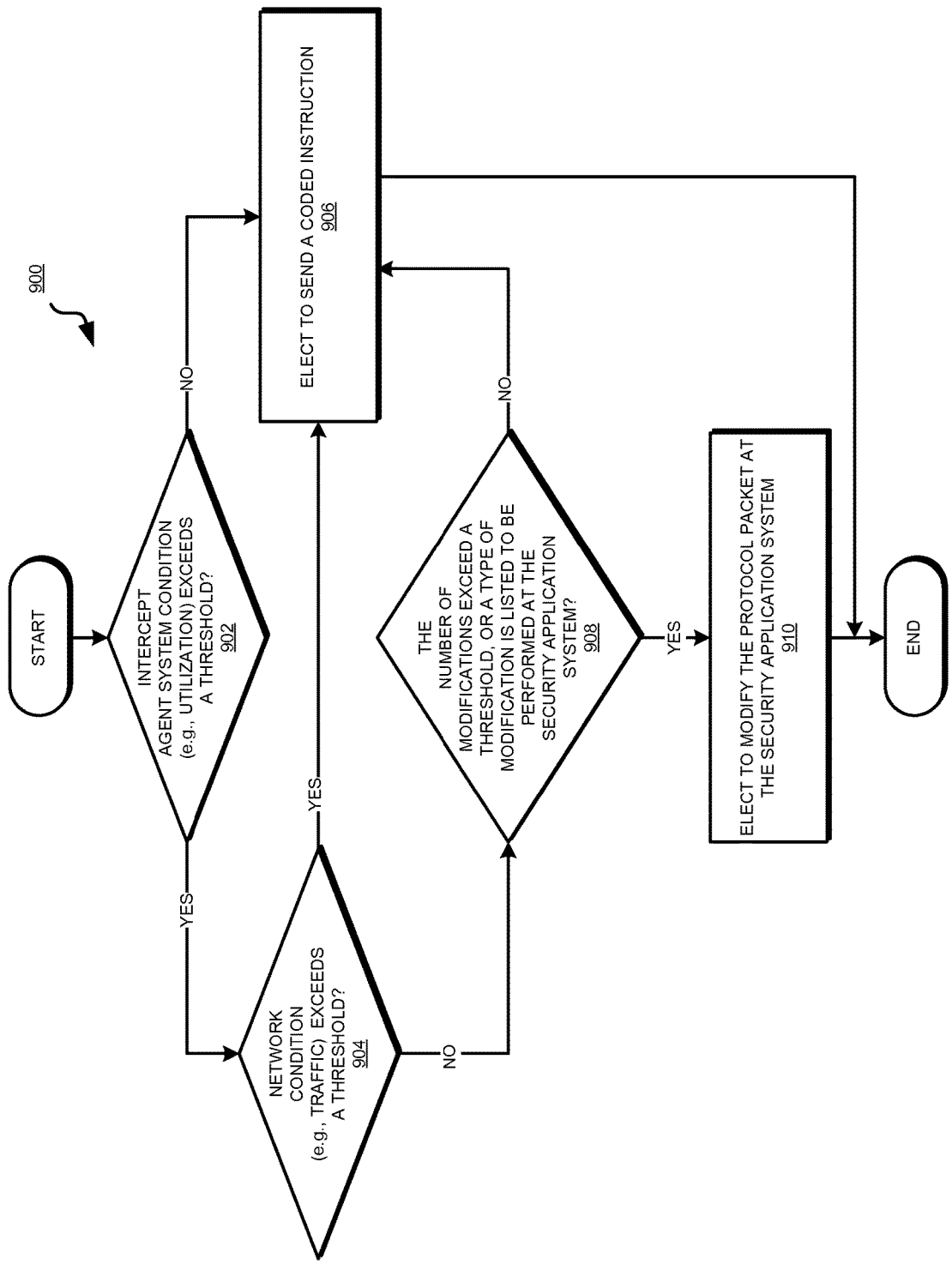
FIG. 9 depicts a flowchart of an example process for determining whether to send an instruction to modify a protocol packet in accordance with an illustrative embodiment.

With reference to FIG. 9, this figure depicts a flowchart of an example process for determining whether to send an instruction to modify a protocol packet in accordance with an illustrative embodiment. Process 900 can be implemented in modified security application 408 in FIG. 4.

The modified security application determines whether the intercept system condition, e.g., a system utilization metric, exceeds a threshold (block 902). If the intercept system condition exceeds the threshold ("Yes" path of block 902), the modified security application proceeds to block 904. If the intercept system condition does not exceed the threshold ("No" path of block 902), the modified security application proceeds to block 906.

At block 904, the modified security application determines whether a network condition, e.g., a traffic throughput metric, exceeds another threshold (block 904). If the network condition exceeds the threshold ("Yes" path of block 904), the modified security application proceeds to block 906. If the network condition does not exceed the threshold ("No" path of block 904), the modified security application proceeds to block 908.

At block 906, the modified security application elects to send a coded instruction, as in the "Instruction" path of block 810 in FIG. 8, (block 906). The modified security application ends process 900 thereafter.

At block 908, the modified security application determines whether a number of modifications needed in the protocol packet exceeds another threshold, a type of modification required in the protocol packet is listed (e.g., in a security policy) to be performed at the security system, or a combination thereof (block 908). If the number does not exceed the threshold and the type is not limited to the security system ("No" path of block 908), the modified security application proceeds to block 906.

If the number exceeds the threshold, the type of modification has to be performed at the security system, or both ("Yes" path of block 908), the modified security application elects to modify the protocol packet at the security system, as in the "modified protocol packet" path of block 810 in FIG. 8 (block 910). The modified security application ends process 900 thereafter.

Figure 10:
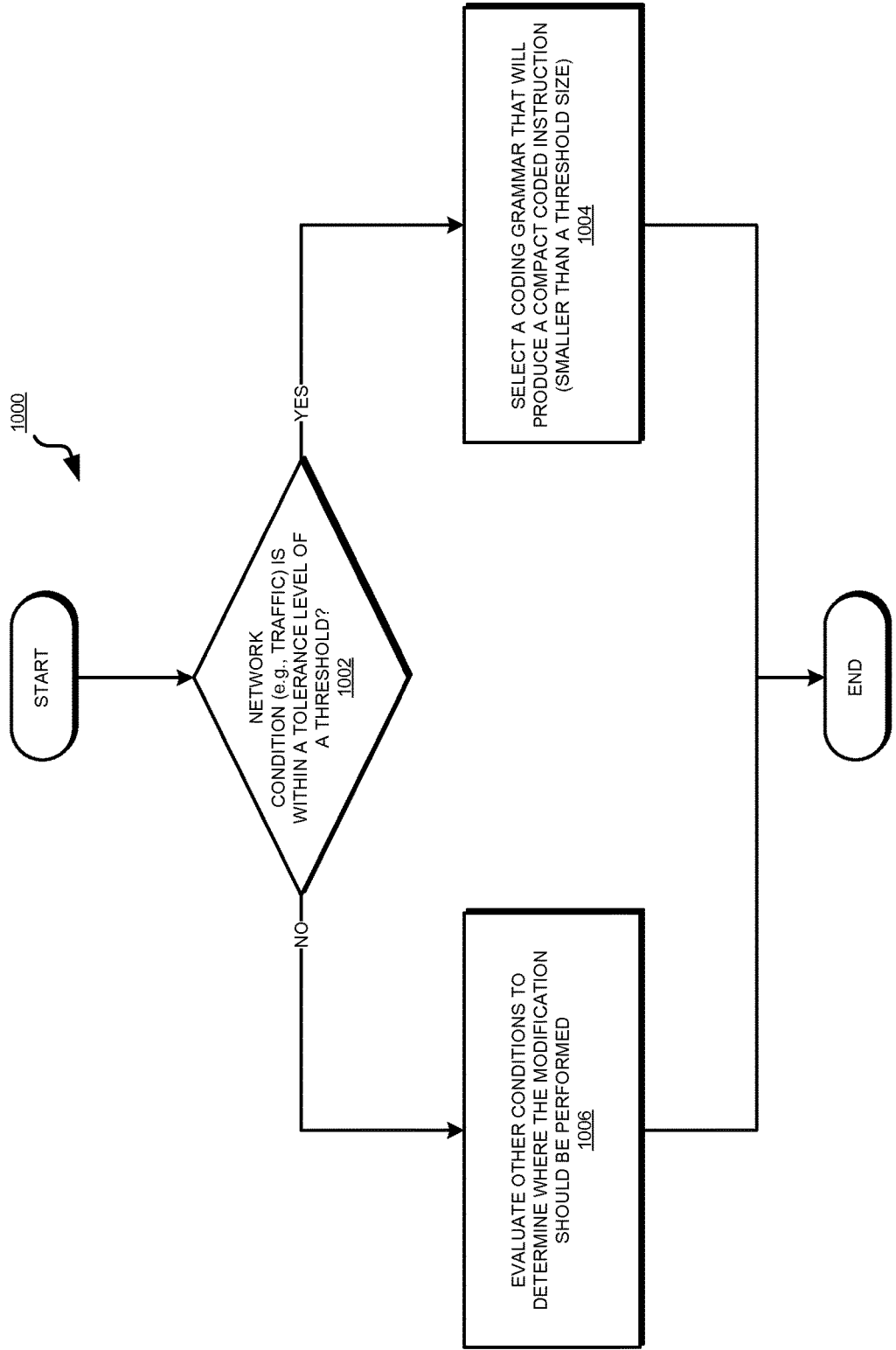
FIG. 10 depicts a flowchart of an example process of optimizing an instruction to modify based on an example network condition in accordance with an illustrative embodiment.

With reference to FIG. 10, this figure depicts a flowchart of an example process of optimizing an instruction to modify based on an example network condition in accordance with an illustrative embodiment. Process 1000 can be implemented in modified security application 408 in FIG. 4, e.g., in block 812 in FIG. 8.

The modified security application determines whether a network condition, e.g., a traffic throughput metric, is within a tolerance level of a threshold (block 1002). For example, if the metric range is 1-10, the threshold is 7, the tolerance level may be 1 less than the threshold, e.g., 6, to indicate that the metric is approaching the threshold. The metric value of 6 or 6.1 may be considered as within the tolerance level, and the metric value of 5 or 5.9 may be considered not within the tolerance level. The example tolerance level and threshold are described only to clarify the terminology, and not to imply a limitation on the illustrative embodiments.

Certain conditions, for example a network performance metric approaching a threshold by being within a tolerance, are indicative of an impending threshold condition, and are reasons to optimize the data transmissions, including the transmission of coded instructions. Accordingly, if the condition of block 1002 is true ("Yes" path of block 1002, the modified security application selects a coding grammar that will produce a compact coded instruction, for example, an instruction of size smaller than a threshold size of instruction (block 1004). The modified security application ends process 1000 thereafter. If the condition in block 1002 is false ("No" path of block 1002), the modified security application evaluates other conditions to determine where to perform the modification, e.g., by using process 900 of FIG. 9 (block 1006). The modified security application ends process 1000 thereafter.

Figure 11:
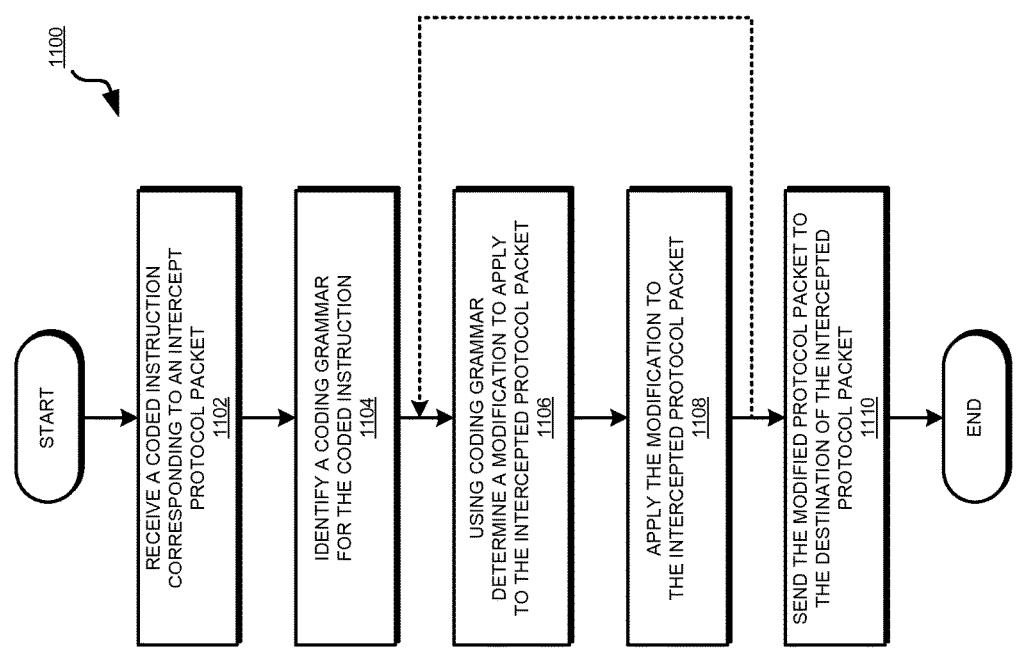
FIG. 11 depicts a flowchart of an example process for performing secure masking of data at an intercept system in accordance with an illustrative embodiment.

With reference to FIG. 11, this figure depicts a flowchart of an example process for performing secure masking of data at an intercept system in accordance with an illustrative embodiment. Process 1100 can be implemented in modified intercept agent 406 in FIG. 4.

The modified intercept agent receives a coded instruction corresponding to an intercepted protocol packet (block 1102). The modified intercept agent identifies a coding grammar corresponding to the coded instruction (block 1104).

Using the coding grammar, the modified intercept agent determines a modification to apply to the intercepted protocol packet (block 1106). The modified intercept agent applies the modification to the intercepted protocol packet (block 1108). The modified intercept agent repeats blocks 1106-1108 as many times as the number of instructions may be and the number of modifications according to those instructions may be in a given circumstance.

The modified intercept agent sends the modified protocol packet to the destination of the intercepted protocol packet (block 1110). The modified intercept agent ends process 1100 thereafter.

Thus, a system or apparatus, and computer program product are provided in the illustrative embodiments for secure data redaction and masking in intercepted data interactions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product for use with a security data processing system and an intercepting data processing system that is a separate structure from the security data processing system, the product comprising:
   a computer readable storage device; and
   computer usable code stored in the computer readable storage device;
   wherein the computer usable code includes code for:
   receiving, by the security data processing system and from an intercepting agent executing in the intercepting data processing system, an intercepted packet;
   applying, by the security data processing system, a security policy to the intercepted packet to determine whether data of the intercepted packet is non-compliant with a set of security policy(ies);
   receiving, by the security data processing system, an indication of a network condition and a plurality of coding grammars, the indication of the network condition including a network traffic throughput metric, wherein the selected coding grammar comprises a representation of a combination of an operation and a data fragment, the combination being positioned at a position in the intercepted packet;
   selecting, by the security data processing system, a selected coding grammar from the plurality of coding grammars based, at least in part, upon the network traffic throughput metric;
   responsive to a determination that data of the intercepted packet is non-compliant with a set of security policy(ies), generating, by the security data processing system and according to the selected coding grammar, an instruction designed to cause a modification of the intercepted packet to make a revised packet that is compliant with the set of security policy(ies); and
   sending the instruction from the security data processing system to the intercepting agent.

2. The product of claim 1 wherein the selected coding grammar specifies a representation of a set of instruction components in the generated instruction.

3. The product of claim 1 wherein the modification is independent of protocol.

4. The product of claim 1 wherein the computer usable code further includes code for applying, by the intercepting agent, the instruction received from the security data processing system to modify a copy of the intercepted packet according to the instruction whereby the copy of the intercepted packet is compliant with the set of security policy(ies).

5. A computer system comprising:
   an intercepting data processing sub-system; and
   a security data processing system;
   wherein the security data processing sub-system is structured, programmed and connected in data communication to:
   receive, from an intercepting agent executing in the intercepting data processing sub-system, an intercepted packet,
   apply a security policy to the intercepted packet to determine whether data of the intercepted packet is non-compliant with a set of security policy(ies),
   receive an indication of a network condition and a plurality of coding grammars, the indication of the network condition including a network traffic throughput metric,
   select a selected coding grammar from the plurality of coding grammars based, at least in part, upon the network traffic throughput metric, wherein the selected coding grammar comprises a representation of a combination of an operation and a data fragment, the combination being positioned at a position in the intercepted packet;
   responsive to a determination that data of the intercepted packet is non-compliant with a set of security policy(ies), generate, according to the selected coding grammar, an instruction designed to cause a modification of the intercepted packet to make a revised packet that is compliant with the set of security policy(ies), and
   send the instruction to the intercepting agent; and
   wherein the intercepting data processing sub-system is structured, programmed and connected in data communication to apply, by the intercepting agent, the instruction received from the security data processing sub-system to modify a copy of the intercepted packet according to the instruction whereby the copy of the intercepted packet is compliant with the set of security policy(ies).

6. The system of claim 5 wherein the selected coding grammar specifies a representation of a set of instruction components in the generated instruction.

7. The system of claim 5 wherein the modification is independent of protocol.

* * * * *